US009057541B2

(12) United States Patent
Rostami et al.

(10) Patent No.: US 9,057,541 B2
(45) Date of Patent: Jun. 16, 2015

(54) SOLAR COLLECTOR AND METHOD FOR MANUFACTURING SUCH A SOLAR COLLECTOR

(75) Inventors: Bardia Rostami, Hamburg (DE); Thorsten Uelzen, Bargstedt (DE); Jan Kruse, Kiel (DE); Wolfgang Schaller, Klagenfurt (AT)

(73) Assignee: Fath GmbH, Spalt (DE)

( * ) Notice: Subject to any disclaimer, the term of this patent is extended or adjusted under 35 U.S.C. 154(b) by 194 days.

(21) Appl. No.: 13/051,530

(22) Filed: Mar. 18, 2011

(65) Prior Publication Data

US 2012/0006319 A1  Jan. 12, 2012

(30) Foreign Application Priority Data

Apr. 24, 2009   (DE) .......................... 10 2009 018 520
Sep. 3, 2009    (EP) ...................................... 09169409

(51) Int. Cl.
   F24J 2/52   (2006.01)
   F24J 2/46   (2006.01)
   F24J 2/26   (2006.01)
   F24J 2/50   (2006.01)

(52) U.S. Cl.
   CPC .......... *F24J 2/4636* (2013.01); *Y10T 29/49355* (2015.01); *F24J 2/268* (2013.01); *F24J 2/4612* (2013.01); *F24J 2/505* (2013.01); *F24J 2/507* (2013.01); *Y02B 10/20* (2013.01); *Y02E 10/44* (2013.01)

(58) Field of Classification Search
   CPC ........ F24J 2/05; F24J 2/507; F24J 2002/5275
   USPC ................. 126/651, 652, 655, 658, 705, 654, 126/660–662
   See application file for complete search history.

(56) References Cited

U.S. PATENT DOCUMENTS

| 1,981,646 | A | * | 11/1934 | Hamley ........................ 434/211 |
| 2,311,579 | A | * | 2/1943 | Scott ............................. 126/662 |
| 2,439,531 | A | * | 4/1948 | Wallace ...................... 269/48.4 |
| 2,566,327 | A | | 9/1951 | Hallock |

(Continued)

FOREIGN PATENT DOCUMENTS

| DE | 2618467 A1 | 11/1977 |
| DE | 2639354 A1 | 3/1978 |

(Continued)

OTHER PUBLICATIONS

Office Action issued Apr. 2, 2014 in EP Application No. 09 169 409.1.

(Continued)

*Primary Examiner* — Jorge Pereiro

(74) *Attorney, Agent, or Firm* — Panitch Schwarze Belisario & Nadel LLP

(57) ABSTRACT

A solar collector (1) is provided having a cover (200), a back wall (300), and an absorber (100), the absorber being arranged between the cover (200) and the back wall (300) and defining, with the cover (200) and/or the back wall (300), a front and/or back cavity (14, 15), respectively. At least one spacer element (400) is provided, which extends from a front surface (102) of the absorber (100) to the cover (200) and/or from a back surface (103) of the absorber (100) to the back wall (300) and is connected or connectable directly to the absorber (100) and/or the cover (200). A method for manufacturing such a solar collector (1) is also provided.

7 Claims, 2 Drawing Sheets

(56) References Cited

U.S. PATENT DOCUMENTS

| | | | | |
|---|---|---|---|---|
| 3,478,395 A * | 11/1969 | Flora | | 24/290 |
| 3,568,001 A * | 3/1971 | Straus | | 361/785 |
| 3,764,729 A * | 10/1973 | Kowalewski | | 174/138 D |
| 3,777,052 A * | 12/1973 | Fegen | | 174/138 D |
| 3,806,124 A * | 4/1974 | Ippen et al. | | 273/241 |
| 3,836,703 A * | 9/1974 | Coules | | 174/138 D |
| 3,916,871 A * | 11/1975 | Estes et al. | | 126/666 |
| 3,961,619 A * | 6/1976 | Estes et al. | | 126/666 |
| 3,974,822 A * | 8/1976 | Patil | | 126/708 |
| 3,986,780 A * | 10/1976 | Nivet | | 403/353 |
| 3,990,201 A * | 11/1976 | Falbel | | 52/171.3 |
| 4,056,092 A * | 11/1977 | Meier et al. | | 126/634 |
| 4,080,957 A * | 3/1978 | Bennett | | 126/636 |
| 4,085,730 A * | 4/1978 | Severson et al. | | 126/647 |
| 4,120,284 A * | 10/1978 | Cotsworth et al. | | 126/659 |
| 4,120,287 A * | 10/1978 | Marles et al. | | 126/658 |
| 4,164,935 A * | 8/1979 | Marles et al. | | 126/659 |
| 4,186,723 A * | 2/1980 | Coppola et al. | | 126/570 |
| 4,200,900 A * | 4/1980 | McGeorge | | 361/803 |
| 4,215,675 A * | 8/1980 | Embree | | 126/661 |
| 4,274,395 A * | 6/1981 | Bangs | | 126/634 |
| 4,281,642 A * | 8/1981 | Steinberg | | 126/661 |
| 4,289,113 A * | 9/1981 | Whittemore | | 126/570 |
| 4,294,232 A * | 10/1981 | Boy-Marcotte et al. | | 126/653 |
| 4,296,742 A * | 10/1981 | Hussmann | | 126/670 |
| 4,332,241 A * | 6/1982 | Dalstein et al. | | 126/711 |
| 4,366,808 A * | 1/1983 | Nash | | 126/667 |
| 4,438,853 A * | 3/1984 | Numbers | | 211/77 |
| 4,495,548 A * | 1/1985 | Matsui | | 361/790 |
| D278,330 S * | 4/1985 | Hill | | D8/354 |
| 4,781,488 A * | 11/1988 | Hayashi | | 403/408.1 |
| 4,881,521 A * | 11/1989 | Kellner | | 126/658 |
| 4,901,204 A * | 2/1990 | Hayashi | | 361/807 |
| 5,018,982 A * | 5/1991 | Speraw et al. | | 439/74 |
| 5,074,282 A * | 12/1991 | Reed | | 126/588 |
| 5,205,091 A * | 4/1993 | Brown | | 52/126.6 |
| 5,572,988 A * | 11/1996 | Walton | | 126/652 |
| 5,596,981 A * | 1/1997 | Soucy | | 126/704 |
| 5,657,745 A * | 8/1997 | Damminger | | 126/633 |
| 6,047,697 A * | 4/2000 | Best | | 126/635 |
| 6,298,633 B1 * | 10/2001 | McCorkle et al. | | 52/787.1 |
| 6,390,460 B2 * | 5/2002 | Chupick | | 269/48.1 |
| 6,612,795 B2 * | 9/2003 | Kirchen | | 411/508 |
| 6,619,283 B2 * | 9/2003 | Ghela | | 126/692 |
| 6,827,345 B2 * | 12/2004 | Anderson et al. | | 269/49 |
| 6,955,168 B2 * | 10/2005 | Nakauchi | | 126/650 |
| 7,753,634 B2 * | 7/2010 | Nakazato | | 411/553 |
| 7,810,491 B2 * | 10/2010 | Benvenuti | | 126/653 |
| 8,381,717 B2 * | 2/2013 | Mueller | | 126/569 |
| 2003/0059255 A1 | 3/2003 | Kirchen | | |
| 2004/0164475 A1* | 8/2004 | Anderson et al. | | 269/49 |
| 2004/0261789 A1* | 12/2004 | Nakauchi | | 126/658 |
| 2007/0039611 A1* | 2/2007 | Benvenuti | | 126/652 |
| 2008/0230047 A1* | 9/2008 | Shugar et al. | | 126/569 |
| 2010/0107525 A1* | 5/2010 | Grzybowski et al. | | 52/204.591 |
| 2010/0132697 A1* | 6/2010 | Mueller | | 126/712 |
| 2010/0192505 A1* | 8/2010 | Schaefer et al. | | 52/653.2 |
| 2013/0139806 A1* | 6/2013 | Mueller | | 126/634 |

FOREIGN PATENT DOCUMENTS

| | | | | |
|---|---|---|---|---|
| DE | 2728019 A * | 1/1979 | | |
| DE | 7909689 U1 | 7/1979 | | |
| DE | 3115309 A * | 11/1982 | | |
| DE | 4326442 A1 * | 2/1995 | | H05K 7/14 |
| DE | 10 2006 006 718 B4 | 1/2008 | | |
| EP | 1191288 A2 * | 3/2002 | | F24J 2/05 |
| EP | 1 279 905 B1 | 11/2005 | | |
| EP | 1830140 A2 * | 9/2007 | | F24J 2/04 |
| FR | 2470925 A1 | 6/1981 | | |

OTHER PUBLICATIONS

Office Action issued Nov. 12, 2014 in EP Application No. 09 169 401.1.

* cited by examiner

SOLAR COLLECTOR AND METHOD FOR MANUFACTURING SUCH A SOLAR COLLECTOR

BACKGROUND OF THE INVENTION

The invention relates to a solar collector and also to a method for manufacturing such a solar collector.

From the prior art, solar collectors are known, which comprise a back wall, a surrounding collector frame, an absorber element, and a cover, wherein the absorber element is arranged between the back wall and the cover. Such a solar collector is described, for example, in German Patent DE 10 2006 006 718 B4. In the case of the known solar collector, the cover is constructed as a transparent pane and bonded with the collector frame, which connects the cover to the back wall and the absorber. Here, the cover is arranged spaced apart from the absorber.

In the case of the known solar collector, the absorber element is connected directly to the collector frame. Through the absorption of thermal radiation, the absorber element can expand, wherein, in the case of the known solar collector, the danger arises that the frame will deform. The risk further arises that the distance between the cover and the absorber element increases at least in some areas due to the heating, wherein unfavorable thermal convection and thus reduced efficiency are promoted.

BRIEF SUMMARY OF THE INVENTION

The invention is based on the object of providing a solar collector, which features constant efficiency and is designed, especially structurally, such that a sufficient freedom of movement for the absorber is provided. Furthermore, the invention is based on the object of providing a method for manufacturing such a solar collector.

According to the invention, this object is achieved with respect to the solar collector by the structures described below and with respect to the manufacturing method by the methods described below.

The invention touches upon the idea of providing a solar collector with a cover, a back wall, and an absorber which is arranged between the cover and the back wall and defines a front cavity and/or a back cavity with the cover and/or the back wall, respectively. Here, at least one spacer element is provided, which extends from a front surface of the absorber to the cover and/or from a back surface of the absorber to the back wall. The spacer element is further connected or can be connected directly to the absorber and/or the cover.

Through the spacer element, a constant distance is provided between the absorber and the front or back surface of the absorber and the cover and the back wall, respectively. Unfavorable thermal convection due to an increased distance between the absorber and especially the cover is thus avoided. Here, the spacer element extends from the front surface of the absorber to the cover. Alternatively or additionally, the spacer element extends from the back surface of the absorber to the back wall. The spacer element thus can extend from the back wall to the cover, wherein the spacer element here preferably clamps the absorber. In general, the spacer element is arranged at a right angle to the front or back surface of the absorber.

It is noted that, during use, the front surface of the absorber is preferably arranged turned toward the solar irradiation and the back surface of the absorber is arranged facing away from the solar irradiation. The cover is here positioned on the side of the absorber turned toward the solar irradiation and the back wall is positioned on the side of the absorber facing away from the solar irradiation.

The cover and/or the back wall can comprise a glass, in particular a heat-insulating glass. In this way, a kind of insulating glass composite or insulating glass element is provided that comprises a central absorber. Here, the advantages cited in connection with the spacer element are especially effective. In particular, by the spacer element it is achieved that the solar collector can be produced by standard profiles, whereby the production costs are reduced. Furthermore, the absorber can be arranged freely within the standard profile and thus has sufficient freedom of movement in the case of change in dimensions caused by heat. Overall, the spacer elements allow a simple and economical assembly of the solar collector, especially the insulating glass element with integrated thermal solar collector. The spacer elements also allow an assembly and/or the use or utilization of the solar collector in an inclined position or horizontally on a table.

Preferably, the spacer element has a pin-like construction. The spacer element thus has a relatively small cross section, so that the function of the absorber is barely negatively affected.

In general, the spacer element preferably has a softener-free plastic. The plastic is expediently stable for temperatures occurring in the solar collector. For this purpose, the plastic can have glass fiber admixtures, which increase the stiffness of the collector very generally, in particular also for the case of stagnation. Instead of such a thermoplastic material, duroplastic materials or ceramic materials can also be used.

The spacer element can have a mounting region, which is connected or can be connected directly to the absorber. It is also possible that the absorber forms one unit with the spacer element, wherein it is not excluded that the absorber is connected to several spacer elements.

The mounting region can further comprise a front face, in particular an axial front face, of the spacer element. Thus, for the connection of the absorber to the spacer element, no special structural elements or measures on the absorber are required.

Alternatively, the mounting region can comprise a peripheral sub-face of the spacer element. It is also possible that the mounting region comprises a complete peripheral face of the spacer element. By the peripheral face, the spacer element can be coupled or connected, for example, to a drill hole in the absorber. The peripheral sub-face or peripheral face can also comprise a thread, which interacts with a counter thread in the absorber.

Preferably, the spacer element comprises at least one clamping means or tensioning means, which defines the mounting region. The clamping means or tensioning means allows a simple and quick connection of the spacer element to the absorber. For example, the clamping means can have a snap connection-like construction. The clamping means can be clamped with the absorber, for example for mounting, and can form a barbed hook-like locking device. The tensioning means can comprise, for example, a threaded nut that interacts with a fixing element, such that the absorber can be clamped between the fixing element and the nut.

For a preferred embodiment of the solar collector according to the invention, the absorber comprises an absorber sheet or an absorber tube, which is connected or can be connected directly to the spacer element.

The mounting region can form a rail-like, in particular C-shaped profile, which is connected or can be connected, in particular clamped, to the absorber tube. The assembly of the solar collector is thus further simplified. In particular, with the C-shaped profile of the mounting region it is possible to simply clip or place the absorber spacer element on the absorber tube. Additional connections or connection measures are not absolutely required.

The mounting region can further comprise a groove, which surrounds a side face of the absorber sheet. Preferably, such a spacer element has a plate-like construction and has the mounting region constructed as a groove towards the absorber. Here, the spacer element can form a profile element, which surrounds the absorber sheet like a frame or strip.

The spacer element is preferably bonded and/or fused and/or screwed and/or press-bonded to the absorber. Other connection types are also possible. In general, it is advantageous if the spacer element is connected to the absorber, such that the absorber forms one unit with the spacer element or with the several spacer elements. Such an absorber unit can be provided, for example, in a prefabricated manner, so that the final assembly of the solar collector is simplified and accelerated.

According to one associated aspect, the invention touches upon the idea of providing a method for manufacturing such a solar collector, wherein at least one spacer element is connected to an absorber and the absorber is then arranged between a back wall and a cover. Here, the absorber has a spacing to the back wall and/or to the cover, wherein this spacing is determined by the length of the spacer element.

The spacer elements between the absorber and the back wall or the back glass pane and the cover or the front glass pane are preferably distributed in a plane across the absorber. Preferably, several spacer elements are provided that extend from the absorber to the cover and/or to the back wall. The distribution of the spacer elements is here adapted preferably such that deformation of the absorber caused by temperature is essentially damped. For example, the spacer elements can be distributed such that each spacer element is allocated at most 2500 $cm^2$, in particular at most 2025 $cm^2$, in particular at most 1600 $cm^2$, in particular at most 1225 $cm^2$, in particular at most 900 $cm^2$, in particular at most 625 $cm^2$, in particular at most 400 $cm^2$, in particular at most 225 $cm^2$, in particular at most 100 $cm^2$, in particular at most 25 $cm^2$, of the surface of the absorber or absorber sheet.

Advantageously, the spacer elements are arranged in a central region of the absorber or absorber sheet. For example, the spacer elements can be arranged only in the region of the absorber sheet in which the absorber tube is also positioned. The edge region of the absorber can be free from spacer elements. Such a free edge region of the absorber preferably comprises at least 5%, in particular at least 10%, in particular at least 15%, in particular at least 20%, of the overall surface area of the absorber or the absorber sheet. Preferably, the spacer element-free edge region of the absorber or absorber sheet extends at least 2 cm, in particular at least 5 cm, in particular at least 10 cm, in particular at least 15 cm, from the outer edges of the absorber or absorber sheet in the direction of the center of the absorber.

The spacer elements can be distributed uniformly across the surface of the absorber. However, it is not excluded that the spacer elements are distributed non-uniformly across the surface of the absorber. The distribution of the spacer elements can be selected such that expected thermal deformation of the absorber is to be supported selectively. For example, by a FEM analysis, deformation regions of the absorber can be determined in advance, so that spacer elements are arranged selectively in these regions. The number of spacer elements can be selected in this way such that a balance is set between a minimum number of spacer elements and the greatest possible support of the absorber.

The spacer elements are preferably connected to the absorber or to the absorber sheet. It is possible that the absorber forms a prefabricated component for the solar collector, wherein the spacer elements are components of the prefabricated component or absorber. For this purpose, the spacer elements can be constructed integrally or in one piece with the absorber. Preferably, the absorber and the spacer elements form a common assembly.

Alternatively, the spacer elements can be prefabricated as components of the cover or the back wall. The cover or the front glass pane and/or the back wall or the back glass pane can thus already comprise prefabricated spacer elements or can be constructed in one piece with the spacer elements. The spacer elements can here form an integral component of the cover or the back wall.

The advantages and effects cited in connection with the solar collector apply essentially analogously for the manufacturing method according to the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
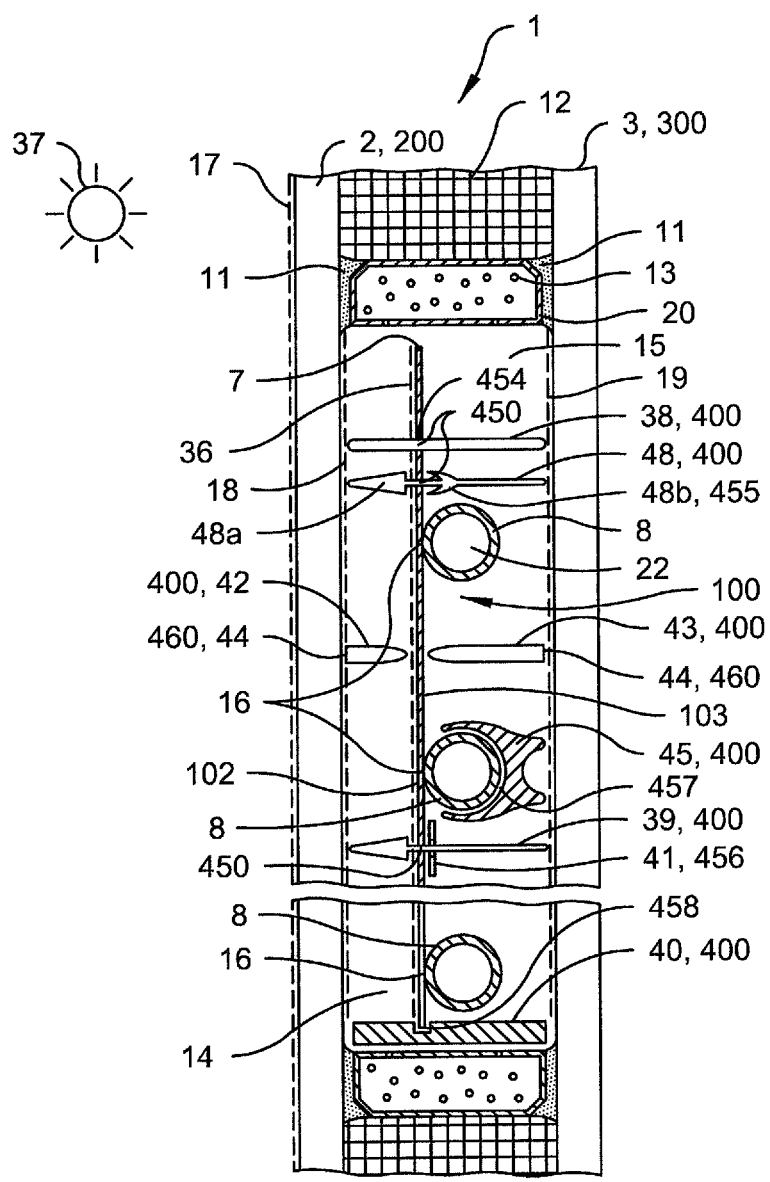
FIG. 1 is a schematic cross-sectional view through an embodiment of a solar collector according to the invention showing different spacer elements according to preferred embodiments.

In FIG. 1 the cross-sectional configuration of a solar collector 1 according to the invention is shown according to a preferred embodiment. The solar collector 1 comprises a front cover 200 and a back wall 300, which are arranged spaced apart from each other. Between the cover 200 and the back wall 300 there is an absorber 7, 8, which comprises an absorber sheet 7 connected rigidly to an absorber tube 8. Between the absorber sheet 7 and the cover 2 there is a front cavity 14. A back cavity 15 is provided between the absorber sheet 7 and the back wall 300. The cavities 14, are each sealed gas-tight relative to the surroundings. For this purpose it is provided, in particular, that at least one spacer element 400 is arranged between the absorber 7, 8 and the cover 200 or the back wall 300.

In the edge region of the solar collector 1, a hollow profile 20 is arranged between the cover 200 and the back wall 300, with this hollow profile being connected by a primary bonding agent 11 to the cover 200 and the back wall 300. Outside of the hollow profile 20, a secondary bonding agent 12 is further provided that connects the cover 200 and the back wall 300 directly. The primary bonding agent 11 preferably has a component based on butyl. The secondary bonding agent 12 preferably contains silicon. In the hollow profile 20 there is a drying agent 13. The drying agent 13 can be constructed as a molecular sieve or can comprise zeolite.

The absorber sheet 7 preferably extends across the entire surface of the solar collector 1 within the cavities 14, 15 bordered by the hollow profile 20. The absorber sheet 7 is coupled at least on one side to the absorber tube 8 by the thermal connection 16. It is also possible that an absorber tube 8 is arranged on both sides of the absorber sheet 7. Preferably, the absorber tube 8 is arranged on the side of the absorber sheet 7 facing away from the solar irradiation. A solar-selective coating 36 is further provided on the side of the absorber sheet turned towards the sun 37. The solar-selective coating 36 increases the efficiency of the absorber sheet 7.

The cover 200 and the back wall 300 can each be constructed as front and back glass panes 2, 3, respectively. The back glass pane 3 or the back wall 300 can comprise a reflection layer 19. The reflection layer 19 is arranged on the inside of the back glass pane 3 or the back wall 300. The reflection layer 19 is thus arranged turned toward the absorber sheet 7 or, in general, to the absorber 100. The reflection layer 19 can comprise a low-E coating. In one especially advantageous construction, the reflection layer 19 has a reflective coating such that, in particular or predominantly, infrared radiation is reflected.

The front glass pane 2 is preferably constructed as a solar glass pane in contrast to the back glass pane 3. This does not exclude, however, that the front glass pane 2 is constructed, if necessary, also as an insulating glass pane or heat insulating glass.

The front glass pane 2 constructed as solar glass comprises, on both sides, an anti-reflection coating 17, 18, wherein a first anti-reflection coating 17 is arranged on the outside of the composite glass pane 1, that is, on the side of the front glass pane 2 turned toward the sun 37, and the second anti-reflection coating 18 is arranged on the rear side of the front glass pane 2, that is, the side of the front glass pane 2 turned toward the absorber sheet 7. The anti-reflection coatings 17, 18 are connected to the front glass pane 2 preferably with a material fit.

In order to achieve an efficiency of the solar collector 1 that is as constant as possible, it is advantageously provided to fill the front cavity 14 and the back cavity 15 with a protective gas, in particular argon. In this way, the formation of condensation is avoided. In addition, the drying agents 13 reduce the risk of condensation.

The absorber sheet 7 and the absorber tube 8 preferably comprise a material with a high heat-transfer coefficient, in particular copper. The thermal connection 16 preferably comprises a metal, in particular a weld seam or a solder point, wherein the weld seam or the solder point can be deposited by a laser method or an ultrasonic method. This mechanical connection between the copper tube or absorber tube 8 and the copper sheet or absorber sheet 7 is thermally active. This means that the thermal connection 16 contributes to the transfer of thermal energy from the absorber sheet 7 to the absorber tube 8.

The front glass pane 2 and the back glass pane 3 each comprise preferably a single-pane safety glass or a heat-strengthened glass or a laminated safety glass.

In FIG. 1, different embodiments of the spacer element 400 are further shown in arrangement with the solar collector 1. It is to be emphasized that the shown spacer elements 400 are used not only in combination with each other, but also separately in the solar collector according to the invention and thus any combination of one of the shown spacer elements 400 with the solar collector 1 is disclosed and claimed.

In the following, individual embodiments of the spacer element 400 are each provided with different reference symbols for reasons of clarity.

The first spacer element 400, 38 has a pin-like construction and passes through the front cavity 14, the absorber sheet 7, and the back pane intermediate space 15. The first spacer element 400, 38 thus extends from the front cover 200 up to the back wall 300. The first spacer element 400, 38 comprises a mounting region 450, which extends through the absorber sheet 7. The mounting region 450 has a peripheral face or peripheral sub-face 454 of the first spacer element 400, 38, which is connected to the absorber sheet 7. This means that at least one part of the peripheral face in the mounting section 450 is used for the connection of the spacer element 400, 38 to the absorber 100 or absorber sheet 7. The peripheral face or peripheral sub-face 454 can be adhesion joined, in particular bonded, to the absorber sheet 7, in particular to an inner peripheral surface of an absorber sheet drill hole, which passes through the first spacer element 400, 38. A different connection, for example screw connection, plug connection, or press connection, is possible. It is also conceivable to fix the first spacer element 400, 38 also mechanically or by adhesion, soldering, or fusing.

One refinement of the first spacer element 400, 38 is implemented with the second spacer element 400, 48. The second spacer element 400, 48 has an essentially pin-like construction and further comprises positioning aids 48a, 48b. Here, a front positioning aid 48a has a conical construction, wherein the cone base is arranged in the region of the absorber sheet 7. A back positioning aid 48b, which is arranged on the side of the absorber sheet 7 turned away from the sun 37 has a vane-like construction, wherein the vanes of the back positioning aid 48b are flexible. The back positioning aid 48b thus forms a clamping means 455 or a snap closure. In this way, the second spacer element 400, 48 can be guided through a drill hole in the absorber sheet 7, whereby the second spacer element 400, 48 is automatically fixed as soon as the back positioning aid 48b is guided through the absorber sheet 7.

A third spacer element 400, 43 has a pin-like construction, wherein the third spacer element 400, 43 extends from the back wall 300 or the back glass pane 3 up to the absorber sheet 7. The third spacer element 400, 43 is connected to the back glass pane 3 by a bonding point 44 or is bonded to the back glass pane 3. The bonding point 44 is arranged on an end face 460 of the third spacer element 400, 43. The third spacer element 400, 43 forms a back spacer element 400. A fourth, front spacer element 400, 42, which is bonded to the front glass pane 2 corresponding to the third spacer element 400, 43 and extends like a pin to the absorber sheet 7, which is allocated to the back spacer element 400 or to the third spacer element 400, 43. For this purpose, between the front glass pane 2 and the front, fourth spacer element 400, 42 there is a bonding point 44, which is arranged in the region of the end face 460 of the fourth spacer element 400, 42. The absorber sheet 7 is held between the third and the fourth spacer element 400, 43, 42. This means that the third and fourth spacer element 400, 43, 42 form a spacer set or an advantageous arrangement of two spacer elements 400, namely the third spacer element 400, 43 and the fourth spacer element 400, 42.

It is likewise possible to provide a spacer element 400, which can be plug-connected or clip-connected to the absorber tube 8. The fifth spacer element 400, 45 shows such a spacer element 400. The fifth spacer element 400, 45 has a front, C-shaped profile 457, which surrounds the absorber tube 8 for the purposes of a plug connection or is clipped onto the absorber tube 8. The C-shaped profile 457 thus forms a detachable plug or clip connection.

The fifth spacer element 400, 45 is arranged on the side of the absorber sheet 7 facing away from the sun 37 and further comprises two contact sections, which extend in the direction of the back glass pane 3 or the back wall 300 and preferably contact the back glass pane 3 and support the absorber 100 or the absorber sheet 7 and the absorber tube 8 against the back wall 300. A different number of peaks extending in the direction of the back glass pane 3 is possible.

A sixth spacer element 400, 39 has an essentially pin-like form, wherein the sixth spacer element 400, 39 forms, in the front cavity 14, a shape corresponding to the front positioning aid 48a of the second spacer element 400, 48. In contrast to the second spacer element 400, 48, the sixth spacer element 400, 39 has a tensioning means 456, in particular, a securing disc 41 on the back side 103 of the absorber sheet 7 or on the side of the absorber sheet 7 turned toward the back glass pane 3. The tensioning means 456 or the securing disc 41 can be screwed with the pin-like sixth spacer element 400, 39. The securing disc 41 forms a clamping fixture for the absorber sheet 7 with the front, cone-shaped section of the sixth spacer element 400, 39.

A seventh spacer element 400, 40 has a profile-like construction and is arranged in the region of the hollow profile 20. In particular, the spacer element 400, 40 is connected to the hollow profile 20 and has, on the side turned toward the absorber sheet 7, a groove 458 in which the absorber sheet 7 engages. The groove depth of the groove 458 must be dimensioned here such that the thermal expansion of the components, in particular of the absorber sheet 7, is taken into account, that is, must be dimensioned greater than the thermal expansion of the absorber sheet 7. The seventh spacer element 400, 40 is further supported on the cover 200 and the back wall 300 and passes through the cavities 14, 15. Preferably, the seventh spacer element 400, 40 has a strip-like construction and has a longitudinal extent that continues along an outer edge of the absorber sheet 7. The seventh spacer element 400, 40 can be coupled with the absorber sheet 7. Here, the seventh spacer element 400, 40 can be connected to the absorber sheet 7 by pinching, clamping, adhesion, or mechanical locking. Preferably, the seventh spacer element 400, 40 comprises an injection-molded element or an extruded element made from a material cited in connection with the second spacer element 400, 48.

It is noted that each of the named spacer elements 400 can be arranged individually or in multiple arrangement in the solar collector 1. It is also possible that the cited spacer elements 400 be used in multiple combinations with each other in the solar collector 1. For example, several first spacer elements 400, 38 can be provided in a composite glass solar collector. Alternatively or additionally, several second spacer elements 400, 48, third spacer elements 400, 43, fourth spacer elements 400, 42, fifth spacer elements 400, 45, sixth spacer elements 400, 39, or seventh spacer elements 400, 40 can be provided. Preferably, several identical spacer elements 400 are to be provided.

Figure 2:
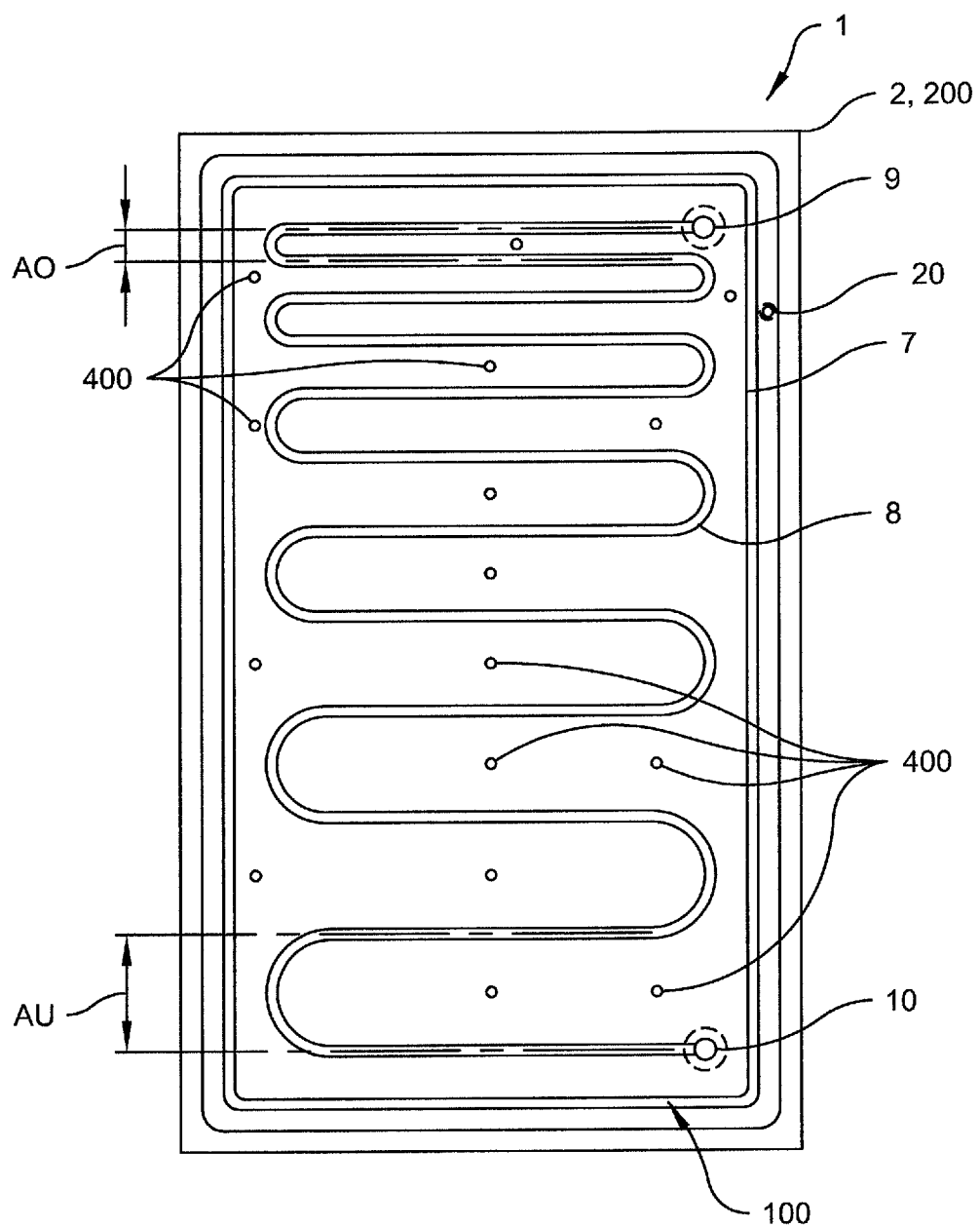
FIG. 2 is a schematic longitudinal sectional view through a solar collector according to another preferred embodiment of the invention.

In FIG. 2, as an example, an advantageous arrangement of the spacer elements 400 is shown on an absorber 100. The absorber 100, which is arranged preferably between a front glass pane 2 and a back glass pane 3 comprises an absorber sheet 7 and an absorber tube 8, which is arranged on the absorber sheet 7 in a meander shape. The absorber tube 8 is connected rigidly to the absorber sheet 7, especially such that a thermal connection, i.e., a heat transfer, is allowed between the absorber sheet 7 and the absorber tube 8. The absorber sheet 7 is further surrounded by the hollow profile 20, which is arranged between the back glass pane 3 and the front glass pane 2. The absorber 100 or the absorber sheet 7 here has a spacing to the hollow profile 20.

The absorber tube 8 comprises a feed line 9 and a discharge line 10, which are each led out from the solar collector 1. In particular, the feed line 9 and the discharge line 10 are guided through the back glass pane 3, not shown in FIG. 2. Here, the feed line 9 and the discharge line 10 each form an angled piece. Preferably, the feed line 9 is arranged in an upper region of the solar collector 1, while the discharge line 10 is arranged in a lower region of the solar collector. This applies especially when the solar collector is constructed as a composite glass solar collector, which is integrated in a building façade in an essentially vertical arrangement. It is also possible that the feed line 9 and the discharge line 10 are arranged reversed. This means that the absorber tube 8, or in general the absorber 100, can carry a flow both essentially from top to bottom and also essentially from bottom to top with a heat-carrier medium. The absorber tube 8 has several meander-shaped windings, wherein the spacing of the meander-shaped windings preferably varies across the height or length of the absorber 100. It is preferred when, in the upper region of the absorber 100, or in general of the solar collector 1, an upper spacing AO of the meander-shaped windings is provided, which is less than a lower spacing AU of the meander-shaped windings in the lower region of the solar collector 1. Preferably, the spacing of the meander-shaped windings increases from the upper spacing AO continuously to the lower spacing AU. The absorber tube density is thus preferably greater in the upper region of the solar collector 1 than in the lower region of the solar collector 1. In this way, the efficiency of the energy conversion in the solar collector 1 is increased, especially for the integration of the insulating glass element or composite glass solar collector in a building façade. This aspect of the varying spacing of the meander-shaped windings is claimed as an independent invention, consequently independent of the provision of spacer elements.

The spacer elements 400 between the absorber 100 and the back wall 300 or the back glass pane 3 and the cover 200 or the front glass pane 2 are preferably distributed in a plane across the absorber 100.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A solar collector comprising a cover, a back wall, an absorber arranged between the cover and the back wall, the absorber together with the cover or the back wall defining a respective front or back cavity, and at least one spacer element having a pin-shape and extending from the cover to the back wall through the absorber and being connected or connectable directly to the absorber to space the absorber from the cover and back wall, wherein the spacer element has a mounting region connected or connectable directly to the absorber, and the spacer element comprises at least one clamp or tensioner which borders the mounting region, the at least one clamp having a snap closure for forming a snap connection with the absorber and having a barbed hook locking device.

2. The solar collector according to claim 1, wherein the mounting region comprises a peripheral sub-face of the spacer element.

3. The solar collector according to claim 1, wherein the absorber comprises an absorber sheet or an absorber tube, which is connected or connectable directly to the spacer element.

4. The solar collector according to claim 1, wherein the spacer element is further connectable to the absorber by at least one of bonding, fusing, screwing, and press-bonding.

5. The solar collector according to claim 1, wherein the solar collector has a frame-less construction.

6. A method for manufacturing a solar collector according to claim 1, the method comprising connecting the spacer element to the absorber, and arranging the absorber between the back wall and the cover, such that the absorber has a spacing to the back wall or to the cover, wherein the spacing is defined by a length of the spacer element.

7. The solar collector according to claim 1, wherein the absorber comprises an absorber sheet and an absorber tube, and wherein the absorber tube is arranged only on a side of the absorber sheet that faces away from solar irradiation.

\* \* \* \* \*